(12) United States Patent
Hamlett (10) Patent No.: US 6,357,991 B1
(45) Date of Patent: Mar. 19, 2002

(54) COMBINATION WATERCRAFT TRANSPORTATION SYSTEM AND DOLLY

(76) Inventor: Curtis L. Hamlett, 11687 Jadewood Cir., Youngstown, FL (US) 32466

( * ) Notice: Subject to any disclaimer, the term of this patent is extended or adjusted under 35 U.S.C. 154(b) by 0 days.

(21) Appl. No.: 09/629,190

(22) Filed: Jul. 31, 2000

Related U.S. Application Data (60) Provisional application No. 60/152,373, filed on Sep. 7, 1999.

(51) Int. Cl.⁷ .................................................. B65F 3/00
(52) U.S. Cl. ..................... 414/538; 414/462; 414/478; 414/480; 414/494; 414/498; 414/529
(58) Field of Search ................................. 414/537, 538, 414/462, 477, 478, 480, 482, 483, 494, 498, 529, 563

(56) References Cited

U.S. PATENT DOCUMENTS

| | | |
|---|---|---|
| 3,550,800 A * | 12/1970 | Robinson .................... 414/462 |
| 4,212,580 A | 7/1980 | Fluck |
| 4,274,788 A | 6/1981 | Sutton |
| 5,556,249 A | 9/1996 | Heine |
| 5,603,600 A | 2/1997 | Egan et al. |
| 5,651,527 A * | 7/1997 | Clarkson ..................... 414/498 |
| 5,795,125 A | 8/1998 | Walkden |
| 5,810,546 A | 9/1998 | Schmoling |
| 5,899,466 A | 5/1999 | Twaits, Jr. |
| 6,176,672 B1 * | 1/2001 | Egan et al. .................. 414/462 |
| 6,210,096 B1 * | 4/2001 | Fielder ........................ 414/538 |
| 6,250,874 B1 * | 6/2001 | Cross .......................... 414/537 |

* cited by examiner

Primary Examiner—Joseph E. Valenza
(74) Attorney, Agent, or Firm—William B. Noll (57) ABSTRACT

Apparatus for transporting, loading and unloading a watercraft, such as a jet ski, or wheeled vehicle from the bed of a pick up truck, where the apparatus is convertible to a mobile dolly for storage of the jet ski or other object. The apparatus comprises a tiltable mechanism formed of a pair of spaced apart rails mounting a pair of pivotal and retractable legs at a first end, a winch mechanism at the opposite end, and a longitudinally movable and pivotal leg support mechanism, movable from the first end to near the opposite end.

8 Claims, 7 Drawing Sheets

COMBINATION WATERCRAFT TRANSPORTATION SYSTEM AND DOLLY

RELATED APPLICATION

This application is based on the priority document, Provisional Application, Ser. No. 60/152,373, filed Sep. 7, 1999, by the inventor hereof under the same title, where the contents thereof are incorporated herein in their entirety.

FIELD OF THE INVENTION

This invention is directed to the field of transportation and storage systems for watercraft, such as jet skis. The system includes a dolly which doubles as a transporting mechanism for the flat bed of a pickup truck.

BACKGROUND OF THE INVENTION

The present invention relates to a tiltable transportation system for watercraft, such as jet skis, for use in the operable mode on the flat bed of a pickup truck, and as a dolly for storage in the inoperable mode.

Jet skis, a popular watercraft recreational vehicle, are most often operated by a single user and due to the fast growing popularity of the sport, a demand has been created for an apparatus which will easily allow a personal watercraft to be loaded and unloaded from a vehicle, and stored by a single person. Such watercraft have up until now been transported primarily on a trailer which is towed behind the vehicle, or the flat bed of a pickup truck. In either case, there is typically some means for allowing the watercraft to be rolled therefrom into the water. Certain apparatus have also been developed for permitting personal watercraft to be transported, loaded and unloaded from the back of a vehicle such as a pickup truck.

Examples of such transporting systems for watercraft, and other vehicles, are found in the following U.S. patents:

a.) U.S. Pat. No. 5,899,466, to Twaits, Jr., teaches a small vehicle loader including a frame formed from a plurality of bars. A pair of wheels are mounted to the frame between a central extent and a front end thereof. A pair of stoppers are coupled to the frame to the rear of the wheels and extended downwardly from the frame.

b.) U.S. Pat. No. 5,810,546, to Schmoling, discloses apparatus for loading and unloading a personal watercraft from a bed of a pickup truck. The apparatus includes an outer rail assembly and an inner rail assembly adapted to telescopically slide into and out of the outer rail assembly. The outer rail assembly is of dimensions permitting it to lay flat on a bed of a pickup truck and to be releasably secured in the bed. Loading and unloading of the watercraft is accomplished by pulling the inner rail assembly slidably out from the outer rail assembly and resting one end on the inner rail assembly in shallow water. A pulley assembly is used by an individual to controllably lower the watercraft into the water or draw the watercraft up out of the water along the inner and outer rail assemblies. Once loading or unloading has taken place, the inner rail assembly is slidably inserted into the outer rail assembly. A dolly is disclosed for enabling the watercraft to be unloaded for storage off of the bed on a pickup truck by a single individual.

c.) U.S. Pat. No. 5,795,125, to Walkden, relates to an extendible ramp assembly for pickup trucks. A platform assembly having a hollow interior is bolted to the floor of the truck bed. A sliding platform is adjustably positioned within the platform assembly to allow for adjusting the angle of incline of an extendible ramp which is attached thereto. The sliding platform is designed to have a minimal thickness so that compression of the platform assembly does not affect movement of the sliding platform. A hinge plate is connected to the ramp to allow for a relatively smooth and continuous surface between the ramp and the top surface of the platform assembly.

d.) U.S. Pat. No. 5,603,600, to Egan et al., teaches an apparatus for loading and unloading a personal watercraft into the bed of a conventional pick-up truck requiring only a single operator. The device includes a support frame mountable to the bed of a pickup truck which supports at least one telescopic, pivotal ramp assembly. The ramp assembly including first and second sections which are telescoped together so as to extend and form an elongated ramp. The first ramp section is pivotally secured at its rear to the rear of the support frame by a hinge assembly. The hinge assembly allows the first and second sections to pivot together and also functions to guide the second ramp section as it slides along a channel in the length of the first ramp section. In operation the personal watercraft or personal watercraft is secured at its bow to a winch cable and pulled on a sled on the second ramp section, once on the sled the second ramp section travels along the first ramp section while the weight of the personal watercraft causes the ramp assembly to pivot downward until it lies in a horizontal plane.

e.) U.S. Pat. No. 5,556,249, to Heine, discloses a cargo loading and unloading system for use with a utility vehicle having a bed including a movable sled for retaining cargo items, a platform mountable to the bed of the utility vehicle for receiving thereon the sled, a ramp for receiving thereover the sled and for facilitating the moving the sled up onto and down from the platform, and a flexible mechanism interconnecting the platform and the sled for controlling the movement of the sled between the ground and the bed of the utility vehicle. The sled has a base, wheels for moving the sled on a support surface and a pair of spaced apart inner longitudinal members which are disposed between the opposite sides of the base. The platform includes a base and a pair of guide rollers disposed above and mounted to the end of the base at the rear end of the utility vehicle bed. The guide rollers mesh with the inner longitudinal members of the sled for the purpose of guiding the sled between the ramp and the platform. The ramp contacts the ground at one end to support the ramp in an inclined orientation such that a second end is engaged with the platform at the rear end of the bed.

f.) U.S. Pat. No. 4,274,788, to Sutton, relates a vehicle mounted carriage and elevating apparatus comprising a support frame secured to the vehicle. A link frame is pivotally secured to the support frame and a post frame is pivotally secured to the vehicle. A carriage which is movably secured to the post frame and to the link frame. Actuating apparatus is secured between the support frame and the carriage and is adapted to move the carriage from a lower inclined position extending rearwardly of the vehicle to a substantially horizontal elevated position wherein the center of gravity of the carriage is positioned above the vehicle and between the wheels of the vehicle.

g.) U.S. Pat. No. 4,212,580, to Fluck, teaches a loading and support rack for a pickup truck load bed and with the rack overlying and extending forwardly of the tailgate of the pickup truck when the tailgate is in a horizontal position. A horizontal transverse winch mounting structure is provided for support from the upper marginal edge portion of the forward wall of the truck bed and includes a winch supported from the mid-portion thereof and vertical stakes supported from the opposite ends thereof snugly downwardly receivable in the upwardly opening stake sockets of the side walls of a pickup load bed closely adjacent the forward end of the bed. An elongated support frame is also provided and includes front and rear ends, dependingly supported ground engageable wheels supported from opposite side portions of its rear end, slightly dependingly supported opposite side forward support wheels and a center real roller as well as opposite side rollers spaced centrally intermediate the opposite ends of the frame. In addition, the forward end of the frame includes an upper horizontal transverse member beneath which the bow of a boat supported from the frame may be received, and opposite side portions of the rear end of the tailgate supported rack include rollers along which opposite side longitudinal members of the boat supporting frame may roll with a boat supported thereon, to which boat the free end of the winch cable is attached for pulling the boat as well as the boat supporting frame up onto and in the load bed of the pickup truck.

One common sight today, though unrelated to the transportation of watercraft, is the transportable gurney used by ambulances and EMS vehicles. The gurney has collapsible wheels that allows the gurney to lie relatively flat on the back of an ambulance, but which may be extended and locked to transport an injury victim, for example, from the scene of an accident to the ambulance, thence to the hospital and eventually the operating room.

None of the prior art devices discussed above offer the advantages of the present invention. Specifically, none propose a system that allows transporting of a watercraft, loading and unloading, and remote storage, all by a single individual. While such prior art propose solutions to the transportation of watercraft, not one allows the user to readily transport and store the watercraft to free the pickup truck for it normal transporting activities. The manner by which the present invention achieves the goals of this invention will come more apparent to those skilled in the art from the following description, particularly when read in conjunction with the accompanying drawings.

SUMMARY OF THE INVENTION

This invention is directed to a dual purpose watercraft transportation system and dolly, where the invention has two operating modes: (a) transporting a watercraft, such as a Jet Ski, on the bed of a pickup truck, and (b) storing the watercraft at a location from the pickup truck. For either mode, including loading and unloading of the watercraft, all can be accomplished by a single individual. The transportation system and dolly comprises a pair of parallel rail members, preferably outwardly oriented C-channels, spaced apart by plural L-shaped arms and rollers. Mounted on the upper surface of at least a portion of the rail members are plural rollers for rolling engagement with the watercraft during loading and unloading. In the transporting mode, the system hereof includes a tilting mechanism that is removably secured to the truck frame by means known in the art. Forming a part of the tilting mechanism is a ratcheting wheel cooperating with complementary teeth along the lower surface of at least one of the rail members to effect manual movement of the rail members on and off of the bed of the pickup truck. Additionally, the tilting mechanism includes a pneumatic cylinder to facilitate tilting thereof in a safe but deliberate manner.

In order to operate the system in its storage mode, the rails are provided with a pair of telescopic, pivotal legs, mounting rollers, that may pivot from a position in close proximity to the rail members, to an extended position for rolling contact with the ground. Finally, winch means are provided at the forward end of and secured to the rail members to manually move the watercraft to a forward most position, particularly when loading same onto the rail members.

Accordingly, an object of this invention is the provision of the combination of a watercraft transportation system and dolly that can be operated by a single individual.

Another object hereof is the provision of a watercraft transportation mechanism that may be removed from the bed of a pickup truck to allow normal and unrestricted use of the truck.

These and other objects will become more apparent to those skilled in the art from the following description, particularly when read in conjunction with the accompanying drawings.

BRIEF DESCRIPTION OF DRAWINGS

FIG. 3 is a perspective view of a preferred dual rail roller mechanism for the mobile watercraft transportation system and dolly of this invention, where the upper surface of the rails mount a series of rollers.

DETAILED DESCRIPTION OF PREFERRED EMBODIMENTS

The present invention relates to a watercraft transportation system and dolly that allows a single user of the system to transport, load, unload, and store the watercraft, such as a Jet Ski. The invention will now be described with regard to the several Figures, where like reference numerals represent like components or features throughout the various views. described with regard to the several Figures, where like reference numerals represent like components or features throughout the various views.

Figure 1:
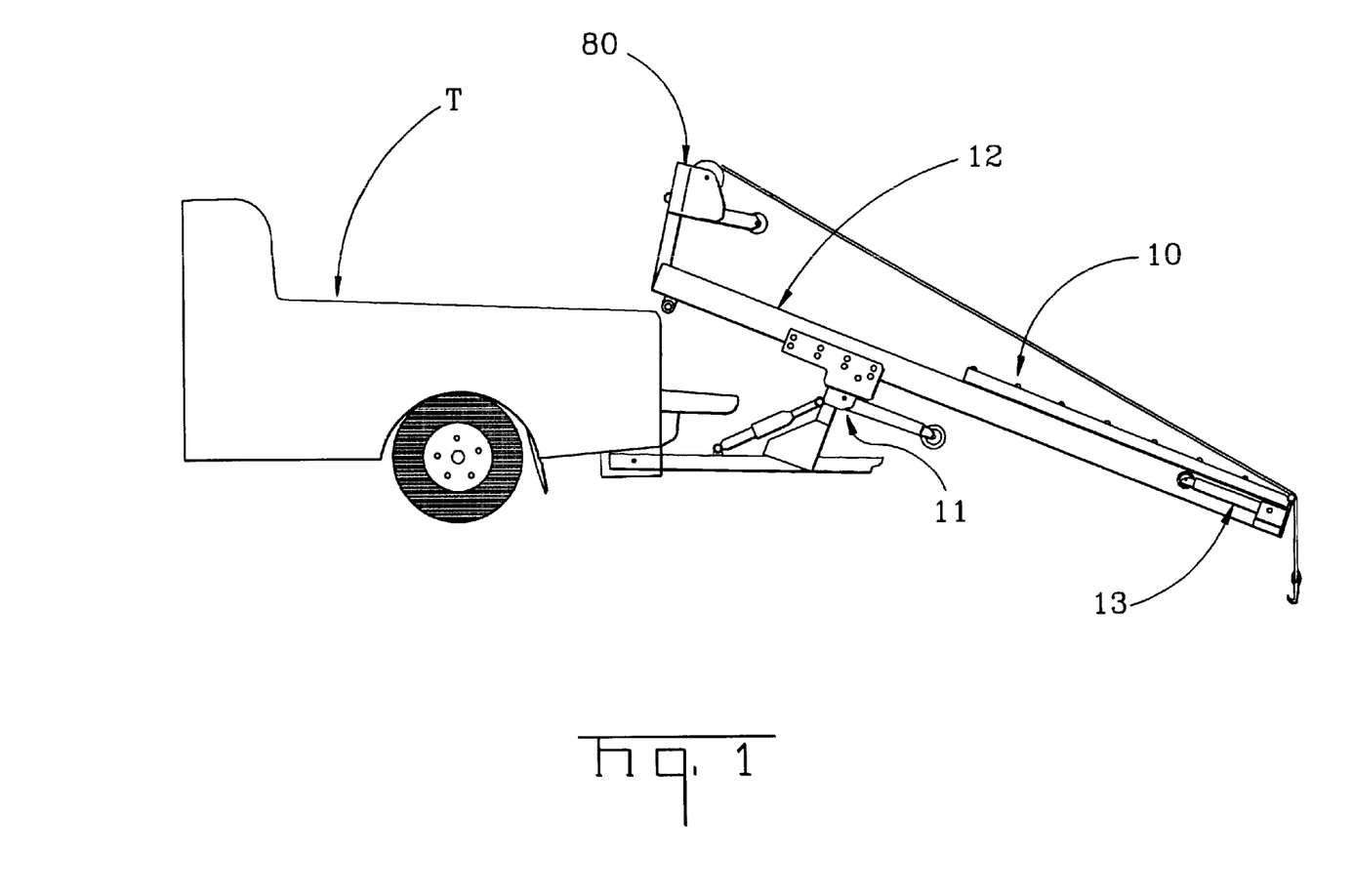
FIG. 1 is a partial side view of a pickup truck, with the mobile watercraft transportation system and dolly secured thereto, showing a first operating mode for the system and dolly of this invention, more specifically the loading or unloading mode.
Figure 2:
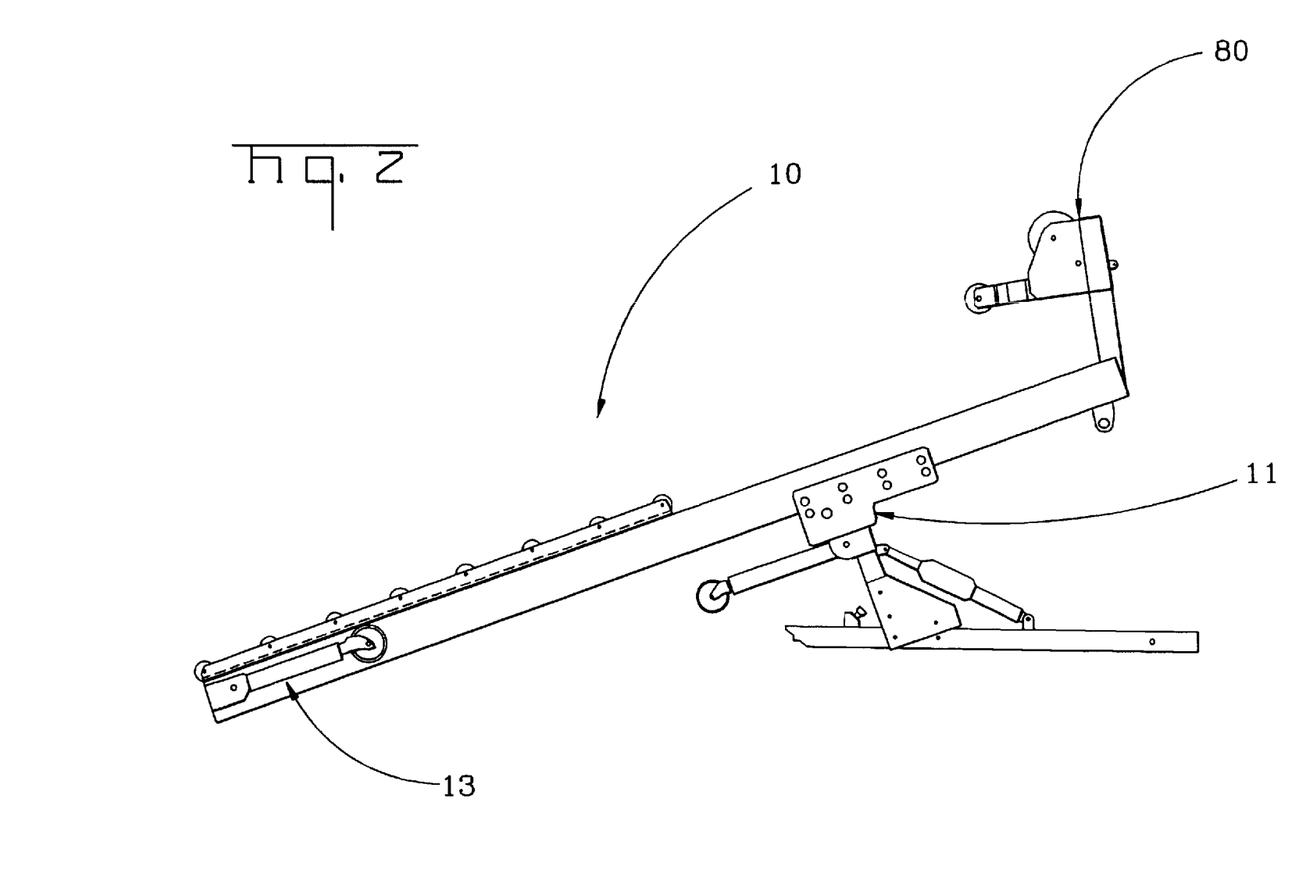
FIG. 2 is an opposite side view of the system and dolly of the invention for the loading and unloading mode.

Turning first to FIGS. 1 and 2, there is illustrated a first operating mode for the transporting system and dolly of this invention. Specifically, FIG. 1 shows the system hereof removably secured to the rear of a pickup truck (T), for example, for a first embodiment thereof, where the watercraft transportation system 10 of the invention is shown in a down position for loading and unloading the watercraft. FIG. 2 shows in clearer detail the system, but without the truck (T).

Figure 4:
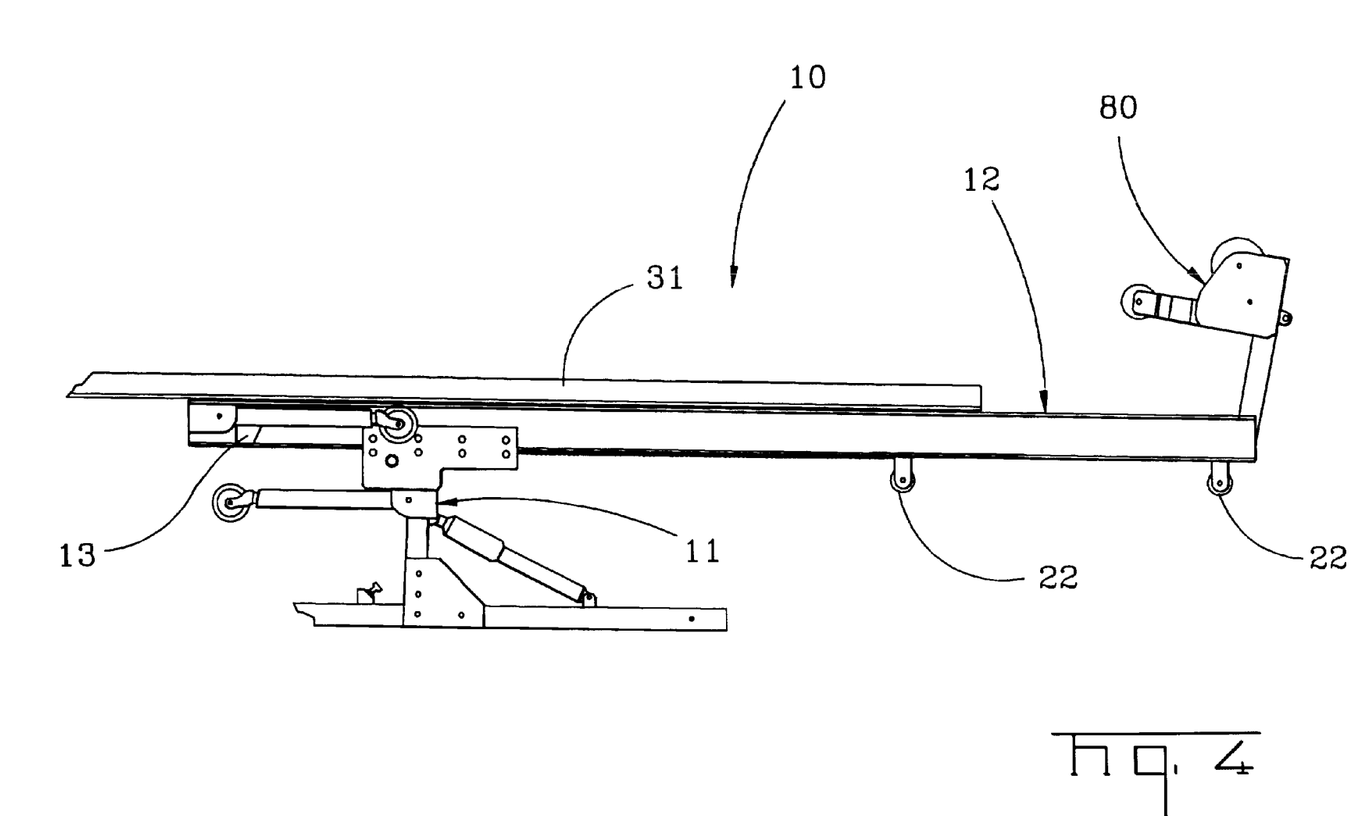
FIG. 4 is a side view of the system and dolly hereof showing the upper surface of the rails bearing a planar member, i.e. plywood sheet, rather than the series of rollers, for transporting a wheeled vehicle, such as a riding mower.

The system 10 hereof includes a rail mechanism 12, where a preferred embodiment is illustrated in FIG. 3, a longitudinally movable and pivotal leg support 11, and a pair of pivotal rear legs 13. Returning first to the rail mechanism 12 in FIG. 3, such rail mechanism 12 comprises a pair of parallel rails 14, preferably C-channels facing outwardly, each with an upper member 15 having an upper surface 16, and a lower member 18 having upper and lower surfaces 19, 19', respectively. The parallel rails 14 are spaced apart by plural L-shaped members 20 and a pair of roller elements 22. Mounted to at least a portion of the upper surface 16 are plural sets of rollers 24, or aligned individual rollers. In the embodiment of FIG. 3, the respective sets are mounted in U-shaped channels 26, with the rollers 24 rotatively engaging the respective side walls 28, and the base 30 thereof secured to the upper surface 16. This has the advantage of allowing the user to easily remove the U-shaped channels 26 to provide a flat surface if the user wishes to transport a different vehicle, such as lawn mower, etc., see FIG. 4, an alternate embodiment. Note particularly the inclusion of a planar plate 31, such as a sheet of plywood for transporting a wheeled vehicle, for example, mounted to the upper surface 16. FIGS. 4 and 5, respectively, illustrate a transporting position for the system hereof, and the movable and/or storage position.

Figure 5A:
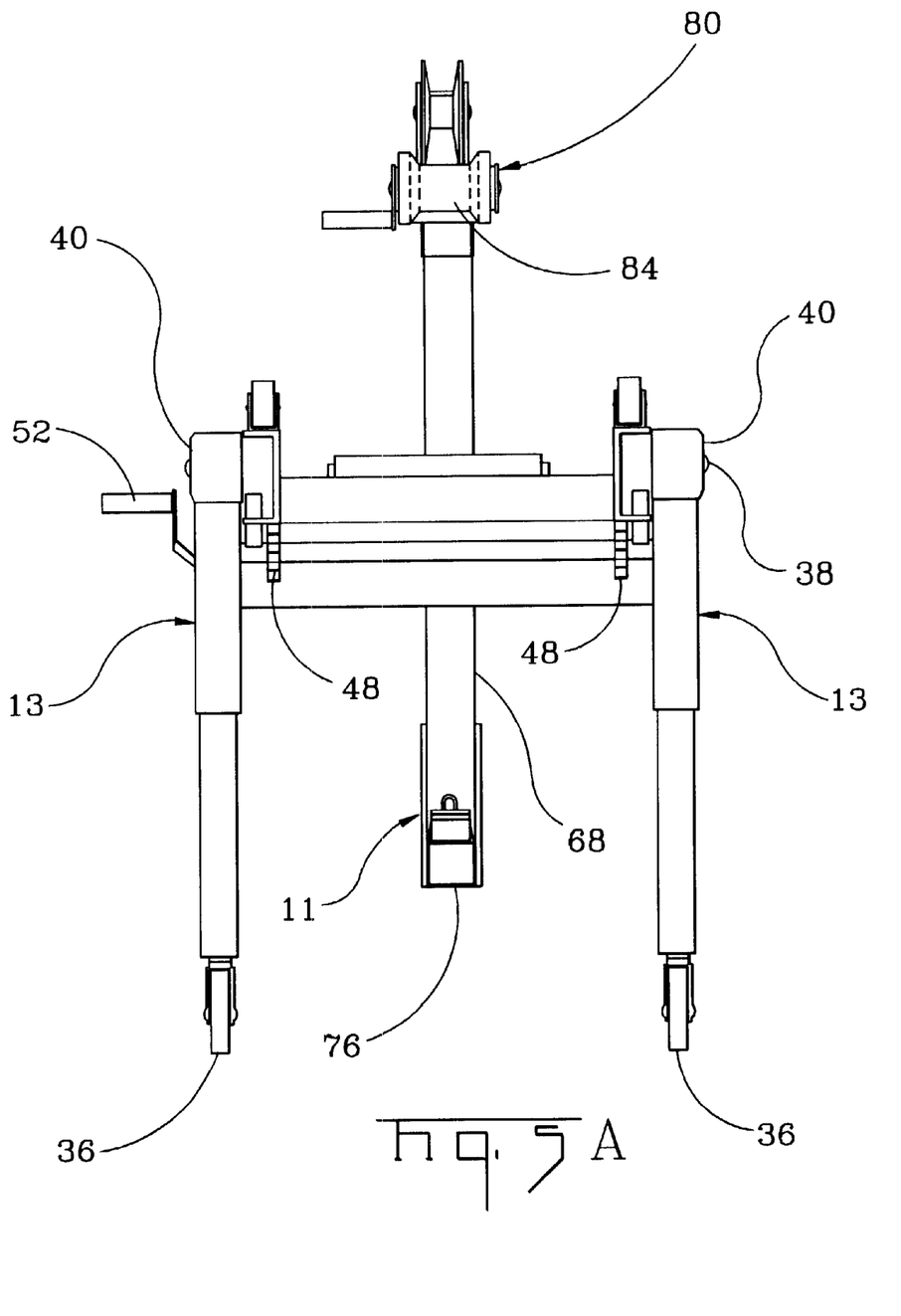
FIG. 5 is a further side view of the system and dolly of the invention, showing the use of the mechanism as a transporting and storage dolly.
Figure 6:
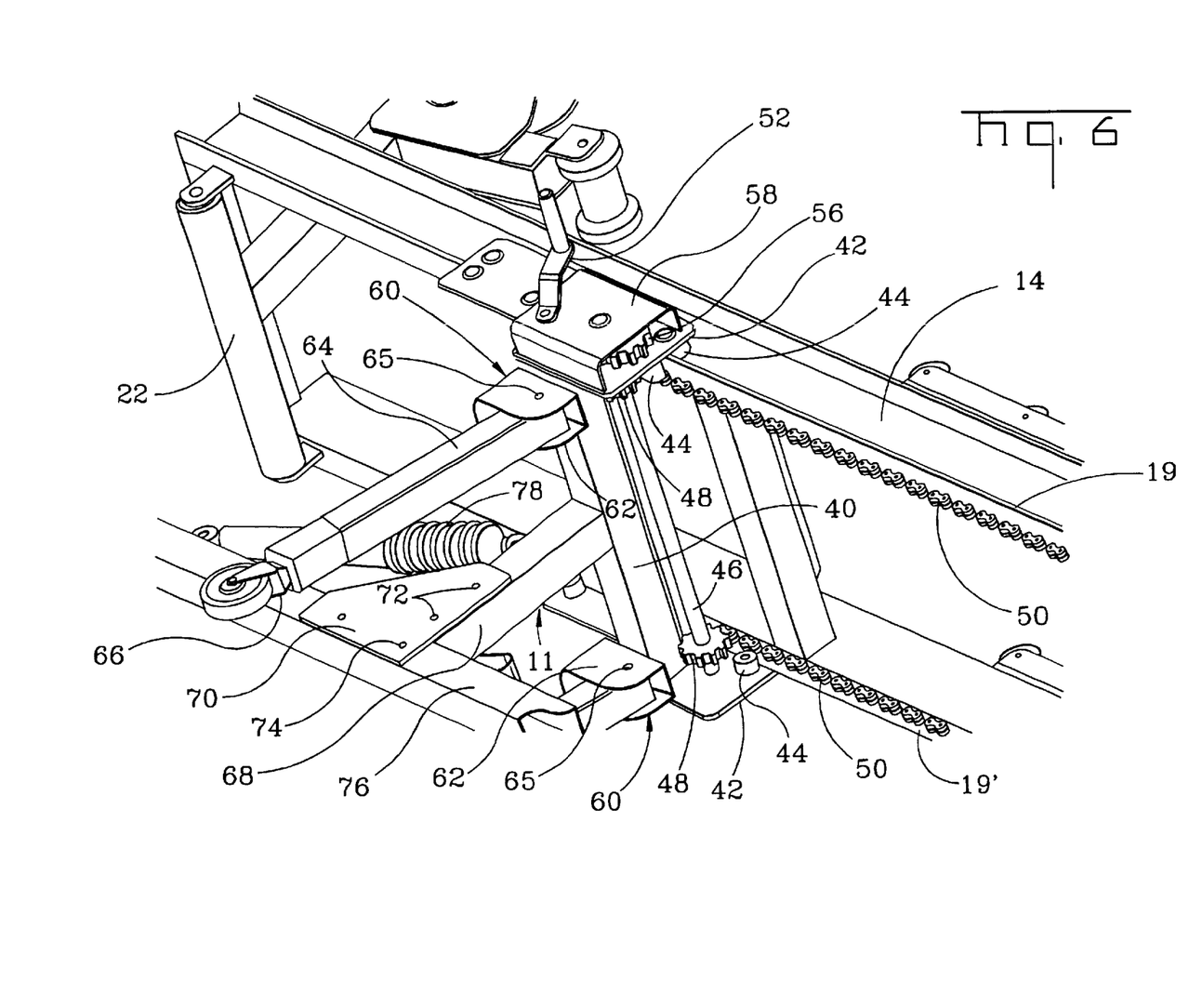
FIG. 6 is an enlarged, partial, perspective bottom view of the system and dolly hereof.
Figure 7:
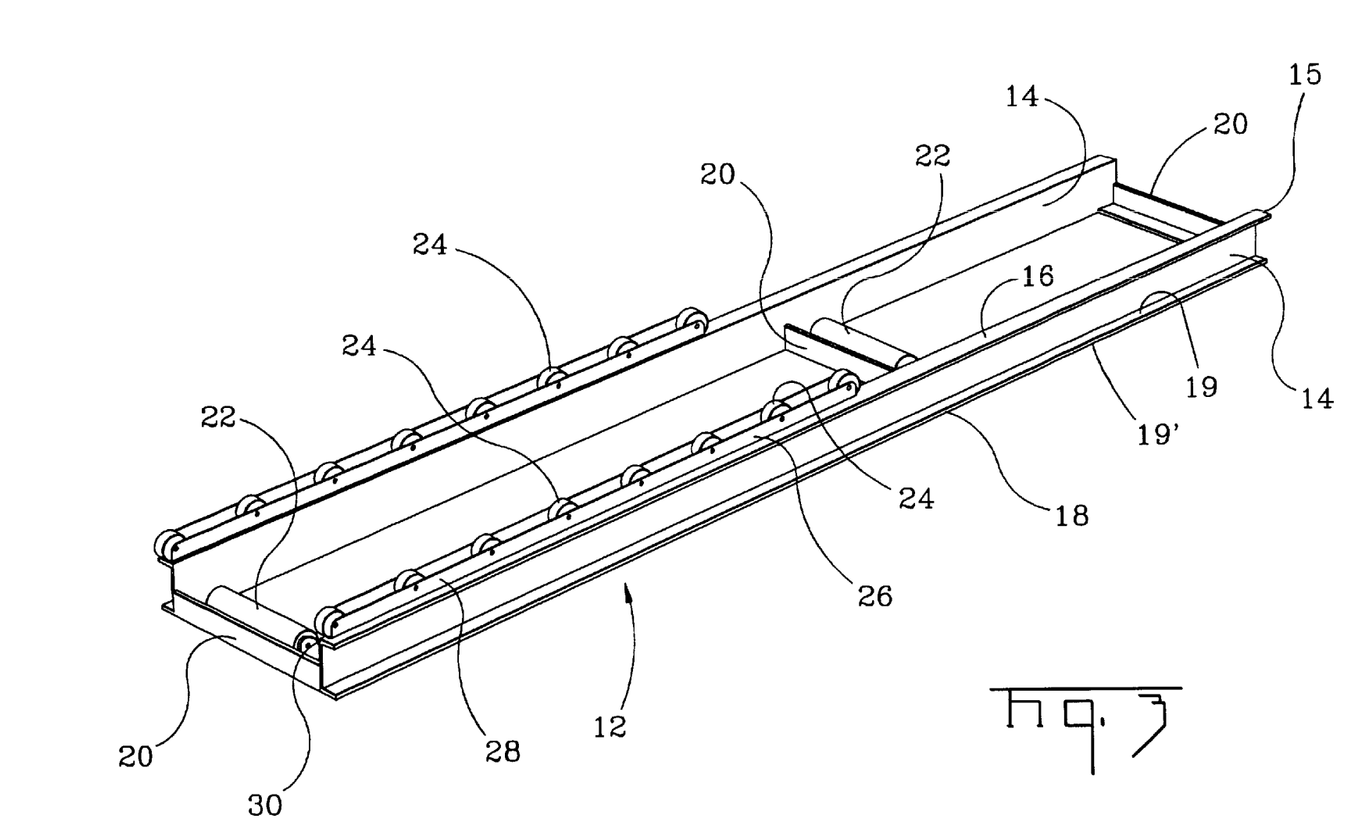

The system 10, as seen in FIGS. 2, 5 and 5A, further includes a pair of pivotal legs 13, each mounting a roller 36 at its free end. The respective legs are pivoted about pin 38 extending between the rail wall and outer plate 40. FIG. 2 shows the pivotal legs 13 in the retracted position lying adjacent the side rails 14. The final component of the system 10 is the longitudinally movable and pivotal leg support mechanism 11 (FIGS. 2 and 4–6). The mechanism comprises a transverse bar 40 mounted between a pair of plates 42. The respective plates 42 include inwardly directed roller members 44 which are adapted to over and under ride the lower rail surfaces 19, 19', see FIG. 6. Additionally, the plates 42 mount a rotating rod 46 with a pair of gears 48 in proximity of the plates 42. These gears 48 cooperate with a respective pair of gear tracks 50 along the lower surface 19' of rail 14 to effect movement of the mechanism 11 relative of the rail mechanism 12. This movement is effected manually by a hand crank 52 which drives a gear 56, within the housing 58, in rotative engagement with the rotating rod 46. Suspended downwardly from the transverse bar 40 are a pair housings 60, each having a pair of parallel side walls 62. Within each pair of side walls is a pivoting, telescopic leg 64, about pin 65, mounting a pivoting roller 66. Projecting downwardly from the transverse bar 40 is a fixed member 68, such as by welding to transverse bar 40, having a pair of generally triangular plates 70 secured such as by fasteners through apertures 72. The lowest aperture 74 is a pivot point, such as by a pin (not shown), for mounting transport towing bar 76, see FIGS. 1 and 2. Additionally, and to avoid abrupt movement of the rail mechanism 12, a pneumatic air cylinder 78 is provided between the fixed member 68 and the towing bar 76. This allows for the controlled lowering and raising of the rail mechanism 12 to thus avoid possible injury or damage. It will be appreciated that the tilting or pivoting of the rail mechanism 12 operates on the same principle as a teeter-totter. That is, the major weight and moment, relative to the pivot point, determines which end is up and which is down. As the watercraft or other wheeled vehicle is moved relative to the pivot point 74, the weight and moment shift from one end to the other. However, particularly for an individual, the tilting could be abrupt causing potential injury to the user or damage to the watercraft or wheeled vehicle. Accordingly, the air cylinder ensures a safe and controlled tilting.

The towing bar 76 is a generally rectangular bar, in cross section, which is slidably received in and engages the standard tubular receptacle, as known in the art, found on many pick up trucks for towing a trailer or other variety of items.

To effect movement of the rail mechanism 12, and to secure the watercraft or other wheeled vehicle during transport, a forward, manually operable, winch mechanism 80 is provided, whereby the transported item may be pulled forward along the rollers 24, or planar member 31, by a cable, as known in the art. Additionally, a rest stop 82, and roller 84, may be included.

The operation or use of the system hereof may be illustrated by the several Figures. As noted above, FIGS. 1 and 2 show the system positioned for loading or unloading the watercraft, for example. That is, the pivotal legs 13 have been retracted to a position against the rail 14 such that the rear end of the rail mechanism is on the ground or in shallow water. To extract the watercraft, the water craft is maneuvered and positioned on the rollers 24 then pulled up the ramp by means of the winch mechanism 80. As the watercraft reaches the mid or pivot point of the rail mechanism, such mechanism slowly begins to tilt to a level position, see FIG. 4. As the rail mechanism continues to move forward into the truck bed along roller 22 whereupon it reaches the stop 82. At this point the watercraft may be secured for transport. Upon arriving at home, or where the watercraft is to be stored, the reverse movement of the rail is effected. However, as the rail mechanism is freed from the truck bed, the pivotal legs 13 are extended and locked in rolling contact with the ground, see FIG. 5. After releasing the towing bar 76 from the pickup truck, the system may now function as a dolly for transporting the watercraft to a selected storage location, such as one's garage. This allows the user to free the use of his truck for other activities.

It is recognized that changes, variations and modifications may be made to the transporting and dolly system of this invention without departing from the spirit and scope thereof Accordingly, no limitation is intended to be imposed thereon except as set forth in the following claims.

What is claimed is:

1. Apparatus for handling watercraft, where said apparatus is convertible from a transporting, loading and unloading mode, to a portable storage mode, said apparatus comprising a tiltable rail mechanism for positioning on the bed of a pickup truck, said tiltable mechanism including;

a.) a pair of spaced apart, parallel rail members fixed in spatial relationship to one another by plural spacer members, said rail members having top and bottom surfaces, where said top surface includes removable roller elements, and the bottom surfaces include gear tracks;

b.) a pair of pivotal, retractable legs mounted at a first end;

c.) a longitudinally movable and pivotal leg support mechanism movable along and in contact with said gear tracks, manual means for moving said mechanism along said gear tracks, a towing arm for removable attachment to said pickup truck, where said support mechanism is pivotal relative to said towing arm, a pneumatic cylinder extending between said towing arm and said support mechanism to control the pivotal action therebetween, and at least one pivotal leg mounting a roller at its free end; and d.) winch means mounted at the second end of said rail mechanism to facilitate movement of said watercraft onto and off said removable roller elements.

2. The apparatus according to claim 1, wherein said bottom surface firther mounts plural, transverse roller members to facilitate sliding movement of said rail mechanism along said truck bed.

3. The apparatus according to claim 1, wherein said longitudinally movable and pivotal leg support mechanism includes a transverse member mounting a pair of pivotal legs, said transverse member further mounting a fixed leg, and said pneumatic cylinder extends between said towing arm and said fixed leg.

4. The apparatus according to claim 3, wherein said transverse member further mounts a gear train in meshing engagement with said gear tracks.

5. The apparatus according to claim 4, wherein manual means are provided to rotate said gear train.

6. The apparatus according to claim 3, wherein said transverse member extends between a pair of plates, where said plates include roller elements in rolling contact with said rail members.

7. The apparatus according to claim 1, wherein said winch means includes a stop member to limit the forward movement of said watercraft.

8. The apparatus according to claim 3, wherein said fixed leg is movable within the plane of said towing bar.

* * * * *